(12) United States Patent
Yazaki

(10) Patent No.: US 12,384,509 B2
(45) Date of Patent: Aug. 12, 2025

(54) ACCUMULATING AND UTILIZING PORT INFORMATION BY SENSOR RECOGNITION

(71) Applicant: Honda Motor Co., Ltd., Tokyo (JP)

(72) Inventor: Makoto Yazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 309 days.

(21) Appl. No.: 17/961,559

(22) Filed: Oct. 7, 2022

(65) Prior Publication Data

US 2024/0118228 A1 Apr. 11, 2024

(51) Int. Cl.
| | |
|---|---|
| *B63H 25/04* | (2006.01) |
| *G01C 21/20* | (2006.01) |
| *G08G 3/02* | (2006.01) |
| *B63B 49/00* | (2006.01) |
| *B63B 79/40* | (2020.01) |

(52) U.S. Cl.
CPC .......... *B63H 25/04* (2013.01); *G01C 21/203* (2013.01); *G08G 3/02* (2013.01); *B63B 49/00* (2013.01); *B63B 79/40* (2020.01); *B63B 2213/00* (2013.01)

(58) Field of Classification Search
CPC ......... B63B 49/00; B63B 79/00; B63B 79/10; B63B 79/40; B63B 2213/00; B63H 25/04; G01C 21/203; G08G 3/00
See application file for complete search history.

(56) References Cited

U.S. PATENT DOCUMENTS

2019/0359300 A1* 11/2019 Johnson ................ G01S 13/867
2021/0094659 A1* 4/2021 Akuzawa ................ B63B 79/15

FOREIGN PATENT DOCUMENTS

| CN | 105575185 A | * | 5/2016 | ............... G08G 3/00 |
| JP | 6661708 | | 3/2020 | |
| JP | 7044018 | | 3/2022 | |
| WO | WO-2017168234 A1 | * | 10/2017 | ............. B63B 43/20 |

* cited by examiner

*Primary Examiner* — Benjamin R Schmitt
(74) *Attorney, Agent, or Firm* — JCIPRNET

(57) ABSTRACT

A system, adapted for a boat to accumulate and utilize information of a port, the system including a control unit having a processor configured to function as a determining part that determines an open berth of the port; and a display part that displays the open berth determined by the determining part on a display. The control unit determines the open berth based on a first data and a second data, the first data includes information of the port obtained at a first timing by a sensor disposed on the boat, the second data includes information of the port obtained at a second timing, wherein the first timing is different from the second timing, and the first timing is a present time.

20 Claims, 8 Drawing Sheets

ACCUMULATING AND UTILIZING PORT INFORMATION BY SENSOR RECOGNITION

BACKGROUND OF THE DISCLOSURE

Technical Field

The disclosure relates to a system of a boat, and more specifically relates to the system of the boat for identifying an open berth in a port.

Related Art

Conventionally, when a boat is to be autonomously moored at a port or a harbor, a user may select a berth for mooring the boat via, for example, an HMI screen.

Therefore, a way for automatically determining an open berth of the port is needed.

SUMMARY

According to an embodiment of the disclosure, a system adapted for a boat to accumulate and utilize information of a port is provided. The system including a control unit having a processor configured to function as a determining part that determines an open berth of the port; and a display part that displays the open berth determined by the determining part on a display. The control unit determines the open berth based on a first data and a second data, the first data includes information of the port obtained at a first timing by a sensor disposed on the boat, the second data includes information of the port obtained at a second timing, wherein the first timing is different from the second timing, and the first timing is a present time.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figure 1:
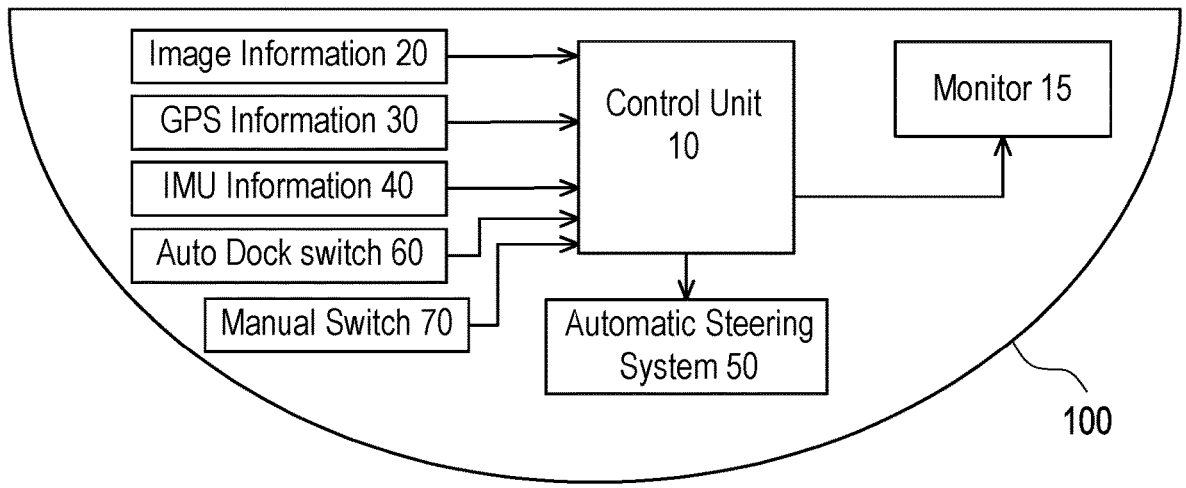
FIG. 1 is a schematic diagram illustrating a system for automatically determining an open berth of a port according to an embodiment of the disclosure.

FIG. 1 is a schematic diagram illustrating a system for automatically determining an open berth of a port according to an embodiment of the disclosure. Referring to FIG. 1, the system is adapted for a boat 100 to accumulate and utilize information of a port. The boat 100 may be, for example, a water vessel, a water craft, a ship and/or the like. The boat 100 includes a propulsion system, for example, a motor for propelling the boat 100 in water. The motor may be, for example, an inboard motor, an outboard motor, a partially inboard-partially outboard motor and the like. A propeller is coupled to an output shaft of the motor. The boat 100 includes a steering system, for example, a steering wheel coupled to a rudder to steer a direction of the boat 100. The steering wheel may be coupled to the rudder by, for example, a cable or a wire or the like.

The boat 100 includes a control unit 10. The control unit 10 includes, for example, a processor and a memory. The boat 100 may include a transmitter and a receiver to perform wireless communication with a database and/or access the internet. The boat 100 includes a manual driving mode and an automatic driving mode. More specifically, the boat 100 includes an automatic steering system 50 for automatically driving/steering the boat in the automatic driving mode. The control unit 10 is coupled to the automatic steering system 50, wherein the control unit 10 outputs (sends/transmits) control signals to the automatic steering system 50 to automatically drive/steer the boat 100. In more detail, the control unit 10 controls an automatic mooring of the boat 100 via the automatic steering system 50. The control unit 10 may also determine an automatic mooring route of the boat 100. The control unit 10 may also automatically determine an open berth for mooring the boat 100. The control unit 10 may switch the control mode of the boat 100 to the automatic docking mode when the boat 100 is automatically steered to dock to a pier.

Referring to FIG. 1, a user may switch an operation mode of the boat 100 to the manual driving mode by, for example, activating a manual switch 70. In addition, the user may switch the operation mode of the boat 100 to the automatic driving mode by, for example, activating the auto dock switch 60. The auto dock switch 60 and the manual switch 70 may each be, for example, a physical push button, a touch button on an HMI (for example, the monitor 15 may be a capacitive touch screen) and/or the like. Each of the auto dock switch 60 and the manual switch 70 is an example of an input unit. The auto dock switch 60 and the manual switch 70 are coupled to the control unit 10, wherein the control unit 10 receives an input from the auto dock switch 60 and the manual switch 70.

Referring to FIG. 1, when the user activates the auto dock switch 60, the control unit includes a switching unit that automatically switches a control mode of the control unit 10 to an automatic driving mode. When the control mode is switched to the automatic driving mode, the control unit 10 is configured to output a control signal to the automatic steering system 50 for controlling an automatic steering of the boat 100, which may be used to automatically dock the boat 100 to an open berth of a port. When the user activates the manual switch 70, the switching unit of the control unit 10 automatically switches the control mode of the control unit 10 to the manual driving mode. When the control mode is switched to the manual driving mode, the control unit 10 is configured to not output the control signal for controlling the automatic steering of the boat 100, or to disengage the automatic steering system 50 of the boat 100 such that the boat 100 may be steered and/or controlled manually by the user.

In more detail, the control unit 10 controls an automatic steering of the boat 100 via the automatic steering system 50 when the control unit 10 is in the automatic driving mode. The control unit 10 may also determine an automatic steering route of the boat 100 when the control unit 10 is in the automatic driving mode. Namely, the control unit 10 may determine the automatic steering route of the boat 100 when the control unit 10 is in the automatic docking mode of the automatic driving mode. In the present disclosure, docking may be used interchangeably with mooring, berthing and/or the like. That is to say, the control unit 10 controls an automatic docking, mooring and/or berthing of the boat 100 via the automatic steering system 50. The control unit 10 may also determine an automatic docking route, an automatic mooring route and/or an automatic berthing route of the boat 100.

The automatic steering system 50 may include, for example, sensors, switches and actuators and/or the like. For example, an actuator may be used for automatically turning the steering wheel. In another example, an actuator may be used for controlling the throttle. A switch may be used to switch the rotating direction of the motor to move forward or reverse. A sensor may be used to detect a position of the boat 100. A sensor may be used for detecting objects in a surrounding of the boat 100.

Referring to FIG. 1, the control unit 10 may receive image information 20, GPS information 30 and IMU information 40. More specifically, the boat 100 may include a GPS for obtaining the GPS information 30. The GPS is an example of a Global Navigation Satellite System (GNSS). In addition, the boat 100 may include an inertial measurement unit (IMU) for obtaining the IMU information 40. The IMU may include, for example, control moment gyros to provide orientation information such as pitch, roll, yaw information of the boat 100.

Figure 2:
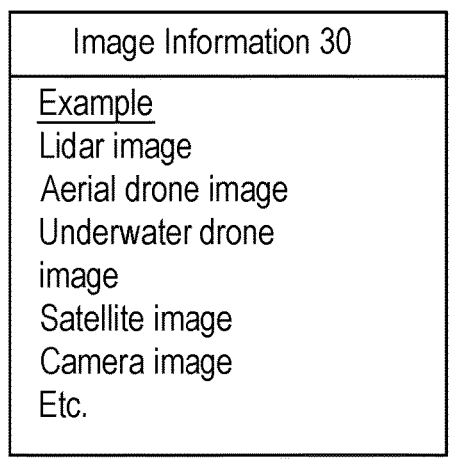
FIG. 2 is a schematic diagram illustrating some examples of image information according to an embodiment of the disclosure.

FIG. 2 is a schematic diagram illustrating some examples of image information according to an embodiment of the disclosure. Referring to FIG. 2, the image information 20 may be, for example, an image from a range finding sensor such as a lidar, a radar, a sonar and/or the like, an aerial drone image, an underwater drone image, a satellite image, a camera image and/or the like. The image information 20 may be an image that is obtained in real time or an image that is stored in a memory. For example, the image information 20 may be obtained in real time from the lidar, the underwater drone, the aerial drone, the camera on the boat 100, the camera on satellite and/or the like. In another embodiment, the image information 20 may be obtained from an image stored in memory, such as images from the lidar, the underwater drone, the aerial drone, the camera on the boat 100, a camera of another boat, the camera on satellite and/or the like that are stored in a memory. The above examples of the image information 20 are described as examples only and are not intended to limit the disclosure.

Lidar is an acronym for "light detection and ranging" or "laser imaging, detection, and ranging". The boat 100 may include the lidar for obtaining the lidar image. The boat 100 may include a camera having an image sensor for obtaining the camera image. The aerial drone image may be obtained from an aerial drone carrying a camera. The underwater drone image may be obtained from an underwater drone carrying a camera. The satellite image may be obtained from a satellite carrying a camera.

Referring to FIG. 1, a monitor 15 is disposed on the boat 10. The monitor 15 is an example of a display unit. The monitor 15 includes a display for displaying an image. The monitor 15 is coupled to the control unit 10.

Figure 3:
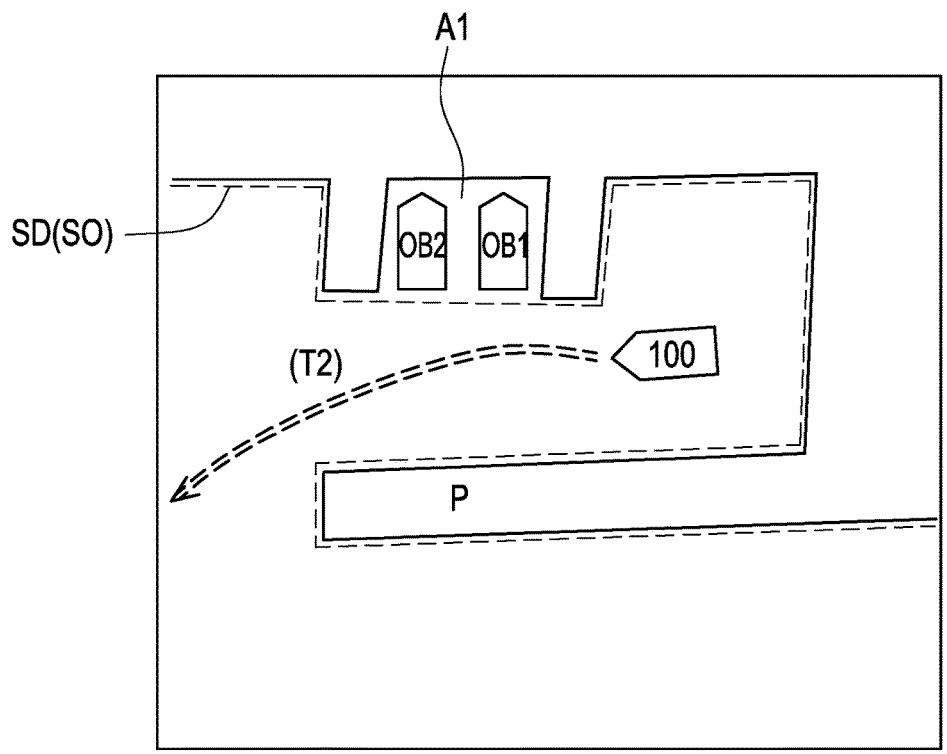
FIG. 3 is a schematic diagram illustrating a second data and a second outline according to an embodiment of the disclosure.

FIG. 3 is a schematic diagram illustrating a second data and a second outline according to an embodiment of the disclosure. Referring to FIG. 3, a first other boat OB1 and a second other boat OB2 are moored at a port P. More specifically, the first other boat OB1 and the second other boat OB2 are moored at a first area A1 of the port P.

Referring to FIG. 3, the boat 100 including the control unit 10 is configured to obtain the image information 20. The image information 20 includes an image of the port P. The image information 20 includes information of the port P obtained at a second timing T2. The image information 20 is an example of a second data SD.

Referring to FIG. 3, a second outline SO may be extracted from the second data SD. The second outline SO includes an outline of a plurality of obstacles O of the port P at the second timing T2. The second outline SO is obtained from the second data SD (the image information 20). The second outline SO is an outline delineating a plurality of obstacles O of the port P at the second timing T2. The second outline SO may be a continuous or discontinuous outline. In the present embodiment, the second outline SO is a continuous outline. The second outline SO is, for example, an outline of a outer most surface of the plurality of obstacles O, the outer most surface is the surface of the obstacle O that is closest to the boat 100 (or the surface of the obstacle O that is closest to an other boat that captured the second data SD). The first other boat OB1 and the second other boat OB2 are examples of the plurality of obstacles O. Furthermore, the port P is also an example of the plurality of obstacles O. The number of the plurality of obstacles O that the second outline SO identifies from the image information 20 is not intended to limit the disclosure. In the present embodiment, the second timing T2 is a timing when the boat 100 departs from the port P. That is to say, the second data SD is data that is obtained by the boat 100 at the second timing T2 when the boat 100 departed from the port P. However, the disclosure is not limited thereto. In another embodiment of the disclosure, the second timing T2 may be a timing when the boat 100 returns to the port P, instead of departing from the port P.

Figure 4:
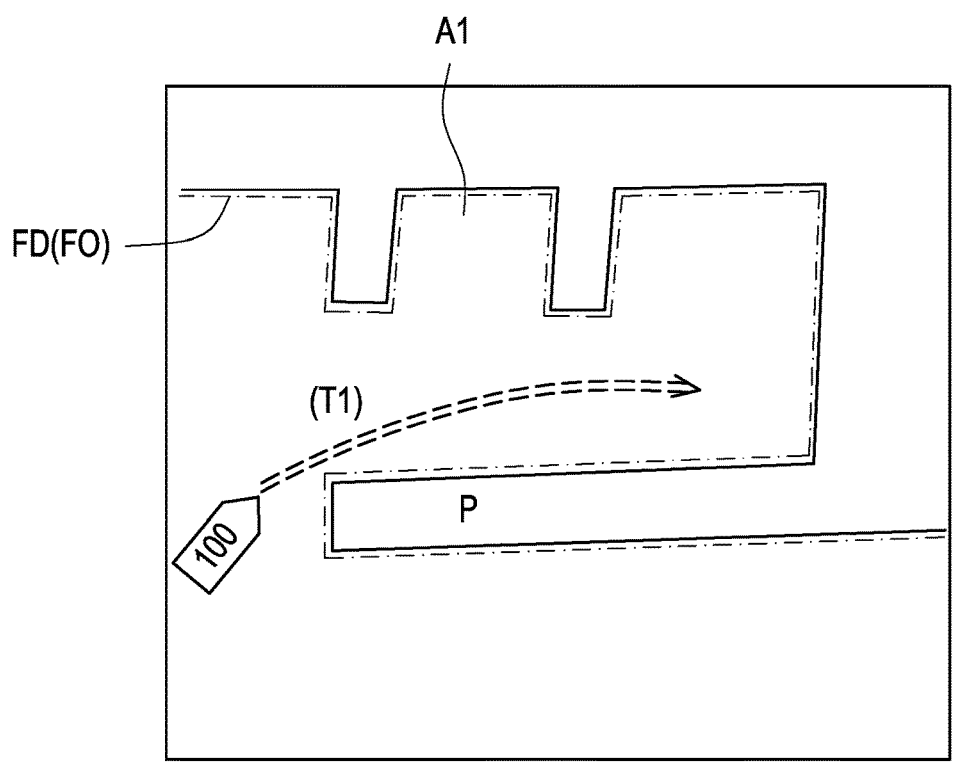
FIG. 4 is a schematic diagram illustrating a first data and a first outline according to an embodiment of the disclosure.

FIG. 4 is a schematic diagram illustrating a first data and a first outline according to an embodiment of the disclosure. Referring to FIG. 4, the first other boat OB1 and the second other boat OB2 are no longer moored at the port P. More specifically, the first other boat OB1 and the second other boat OB2 are not moored at the first area A1 of the port P.

Referring to FIG. 4, the boat 100 including the control unit 10 is configured to obtain the image information 20. The image information 20 includes the image of the port P. The image information 20 includes information of the port P obtained at a first timing T1. The image information 20 is an example of a first data FD. The image information 20 of the first data FD is obtained by a sensor disposed on the boat 100. The sensor may be, for example, the lidar, the radar, the sonar, the camera and the like disposed on the boat 100.

Referring to FIG. 4, a first outline FO may be extracted from the first data FD. The first outline FO includes an outline of a plurality of obstacles O of the port P at the first timing T1. The first outline FO is obtained from first data FD (the image information 20). The first outline FO is an outline delineating a plurality of obstacles O of the port P at the first timing T1. The first outline FO may be a continuous or discontinuous outline. In the present embodiment, the first outline FO is a continuous outline. The first outline FO is, for example, an outline of a outer most surface of the plurality of obstacle O, the outer most surface is the surface of the obstacle O that is closest to the boat 100 (or the surface of the obstacle O that is closest to an other boat that captured the first data FD). The first other boat OB1 and the second other boat OB2 shown in FIG. 3 (at the second timing T2) are no longer moored at the port P shown in FIG. 4 (at the first timing T1). The port P is an example of the plurality of obstacles O. The number of the plurality of obstacles O the first outline FO identifies from the image information 20 is not intended to limit the disclosure. In the present embodiment, the first timing T1 is a timing when the boat 100 returns to the port P. That is to say, the first data FD is data that is obtained by the boat 100 at the first timing T1 when the boat 100 returned to the port P. The first timing T1 is different from the second timing T2. For example, the second timing T2 is a timing prior to the first timing T1. The first timing T1 is a timing that is later than the second timing T2. The first timing T1 may be, for example a present time (a current time). That is to say, the first data FD is obtained at the present time when the boat 100 returns to the port P. However, the disclosure is not limited thereto. In another embodiment of the disclosure, the first timing T1 may not be the present time, but merely another time that is different from the second timing T2. In another embodiment of the disclosure, the first timing T1 may be a timing when the boat 100 departs from the port P, instead of when the boat 100 returns to the port P.

Figure 5:
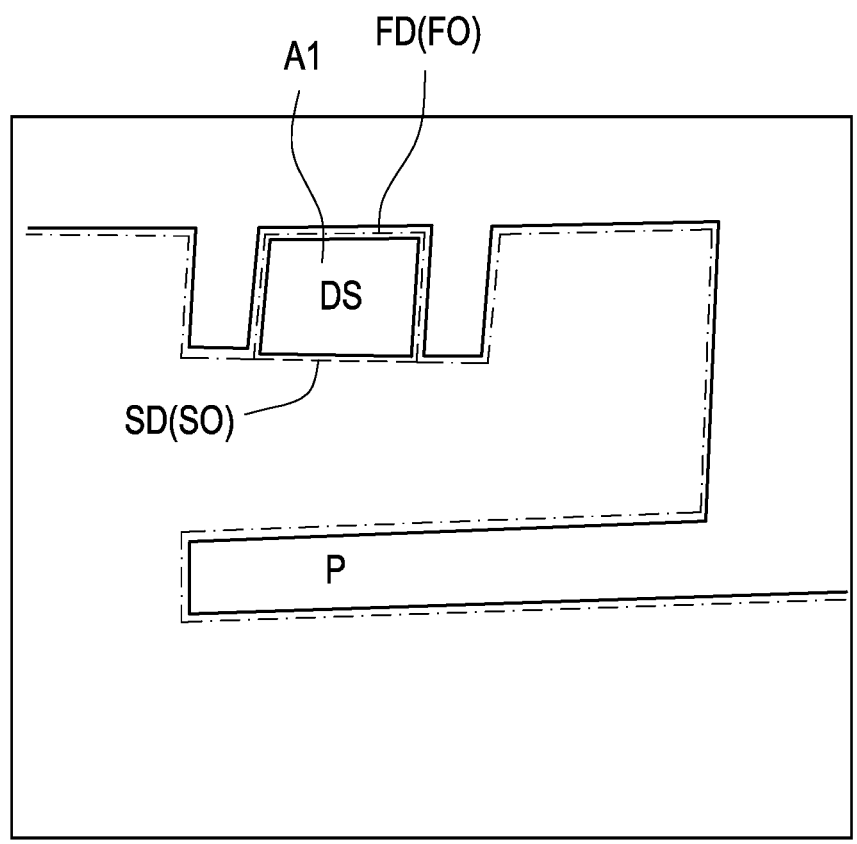
FIG. 5 is a schematic diagram illustrating a difference in shape between the first outline and the second outline according to an embodiment of the disclosure.

FIG. 5 is a schematic diagram illustrating a difference in shape between the first outline of FIG. 4 and the second outline of FIG. 3 according to an embodiment of the disclosure. The control unit 10 is configured to function as a determining part that determines an open berth of the port P for mooring the boat 100. The control unit 10 is further configured to function as a display part that displays the open berth determined by the determining part on the monitor 15.

Referring to FIG. 5, the control unit 10 determines the open berth based on the first data FD and the second data SD. That is to say, the control unit 10 compares the first data FD and the second data SD and detects/determines an other boat OB1, OB2 that is berthed in the first data or the second data SD. More specifically, the control unit 10 compares the first outline FO obtained from the first data FD and the second outline SO obtained from the second data SD, and determines a difference in shape DS between the first outline FO and the second outline SO. An area of the difference in shape DS is determined to be an area of the open berth. In more detail, the control unit 10 may superimpose the first outline FO obtained at the first timing T1 on the second outline SO obtained at the second timing T2 to obtain the difference in shape DS. The control unit 10 compares the first data FD and the second data SD and identifies a possible berthing location, the possible berthing location is identified as the open berth for mooring the boat 100.

Referring to FIG. 3 and FIG. 4, the first area A1 is an example of a first position. When an obstacle O (the first other boat OB1 and/or the second other boat OB2) is identified at the first position A1 in the second data SD shown in FIG. 3, but the obstacle O (the first other boat OB1 and/or the second other boat OB2) is not identified at the first position A1 in the first data FD shown in FIG. 4, the control unit 10 may determine the first position A1 as the open berth.

Figure 6:
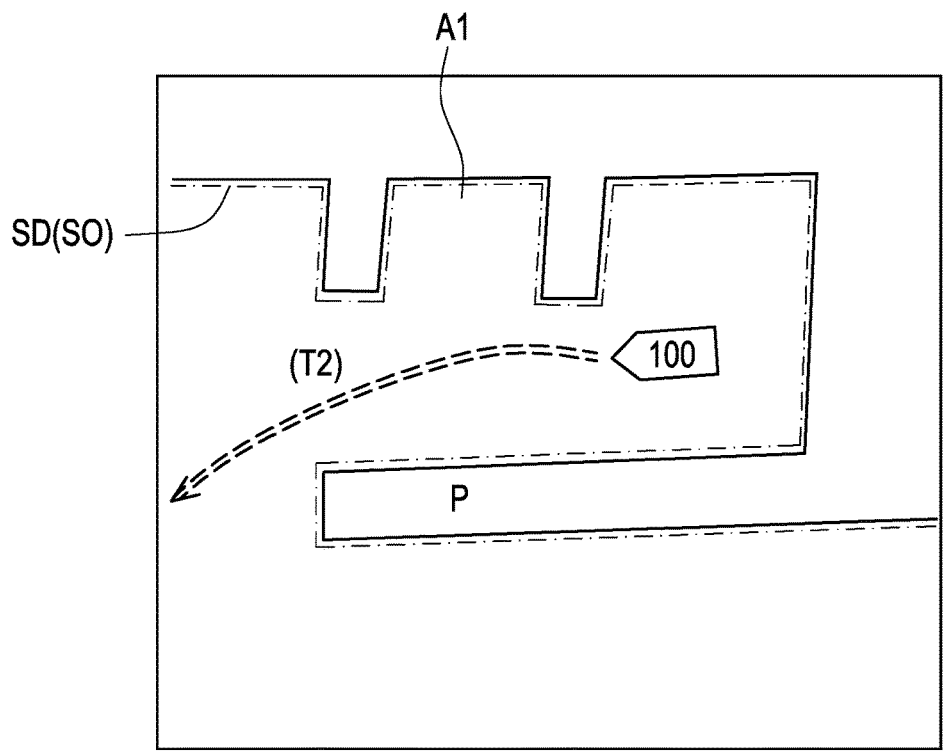
FIG. 6 is a schematic diagram illustrating a second data and a second outline according to an embodiment of the disclosure.

FIG. 6 is a schematic diagram illustrating a second data and a second outline according to an embodiment of the disclosure. A difference between the embodiment shown in FIG. 6 and the embodiment shown in FIG. 3 lies in the presence of the first other boat OB1 and the second other boat OB2. Specifically, in the embodiment of FIG. 6, the first other boat OB1 and the second other boat OB2 are not moored at the first area A1 at the second timing T2.

Figure 7:
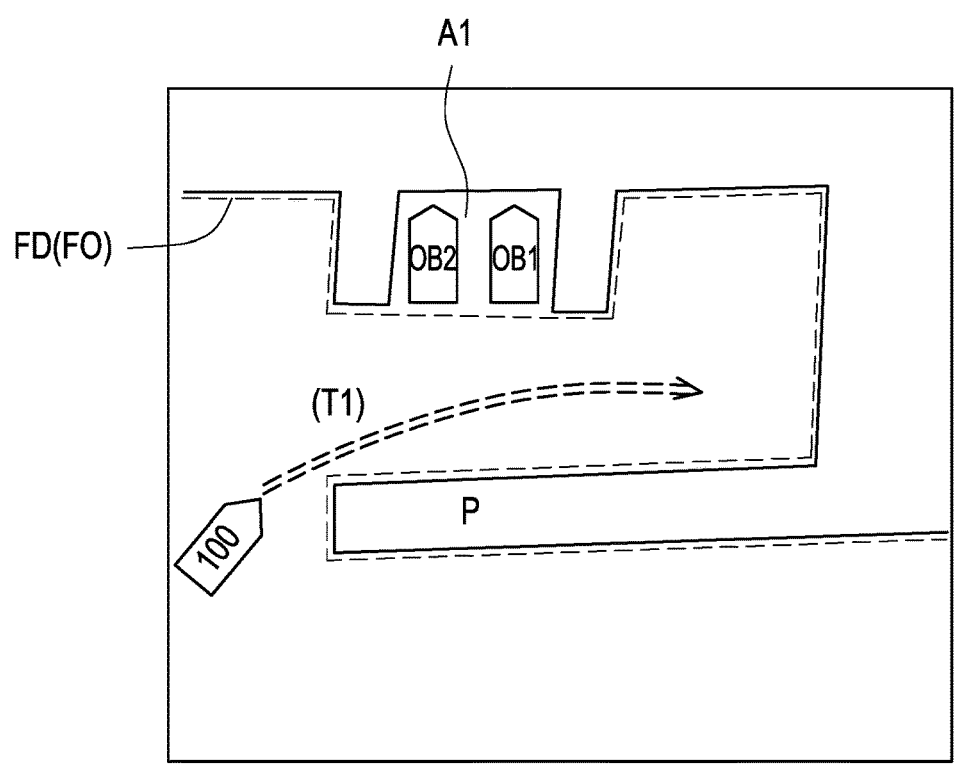
FIG. 7 is a schematic diagram illustrating a first data and a first outline according to an embodiment of the disclosure.

FIG. 7 is a schematic diagram illustrating a first data and a first outline according to an embodiment of the disclosure. A difference between the embodiment shown in FIG. 7 and the embodiment shown in FIG. 4 lies in the presence of the first other boat OB1 and the second other boat OB2. Specifically, in the embodiment of FIG. 7, the first other boat OB1 and the second other boat OB2 are moored at the first area A1 at the first timing T1.

Figure 8:
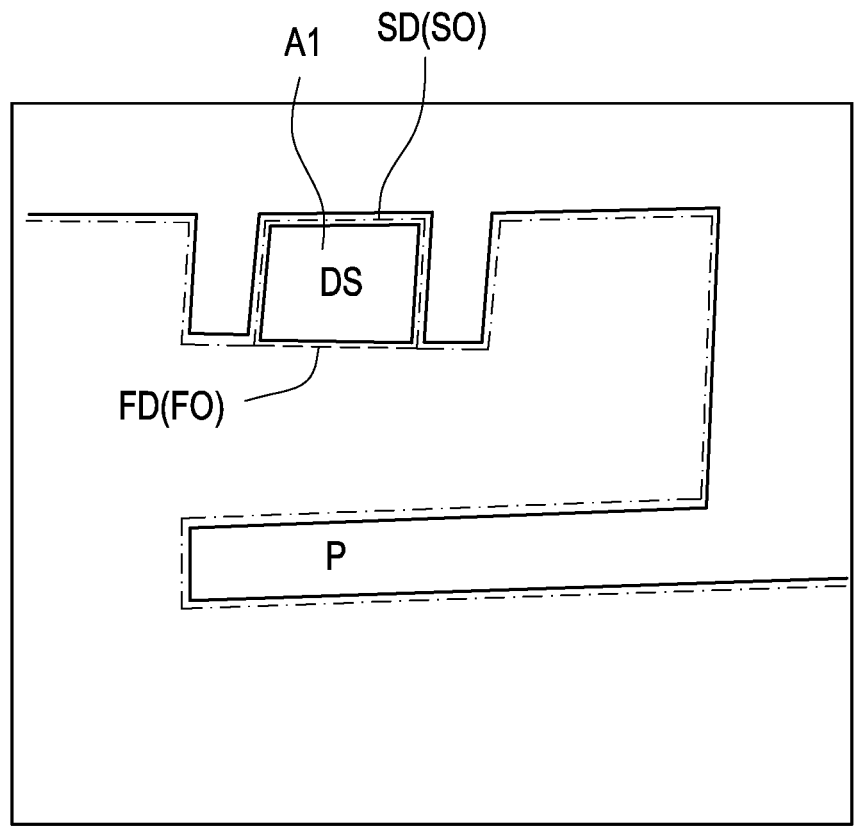
FIG. 8 is a schematic diagram illustrating a difference in shape between the first outline and the second outline according to an embodiment of the disclosure.

FIG. 8 is a schematic diagram illustrating a difference in shape between the first outline of FIG. 7 and the second outline of FIG. 6 according to an embodiment of the disclosure. The control unit 10 is configured to function as a determining part that determines a berth of the port P for mooring the boat 100 is presently occupied by an other boat. The control unit 10 is further configured to function as a display part that displays the presently occupied berth determined by the determining part on the monitor 15.

Referring to FIG. 8, the control unit 10 determines the berth is presently occupied by another boat based on the first data FD and the second data SD. More specifically, the control unit 10 compares the first outline FO and the second outline SO, and determines a difference in shape DS between the first outline FO and the second outline SO, and an area of the difference in shape DS is determined to be the berth which is presently occupied by another boat. In more detail, the control unit 10 may superimpose the first outline FO obtained at the first timing T1 on the second outline SO obtained at the second timing T2 to obtain the difference in shape DS.

Referring to FIG. 6 and FIG. 7, the first area A1 is an example of a first position. When an obstacle O (the first other boat OB1 and/or the second other boat OB2) is identified at the first position A1 in the first data FD shown in FIG. 7, but the obstacle O (the first other boat OB1 and/or the second other boat OB2) is not identified at the first position A1 in the second data SD shown in FIG. 6, then the control unit 10 determines the first position A1 is a berth that is presently occupied by an other boat.

It should be noted, the second data SD obtained at the second timing T2 may be obtained by various methods. For example, the second data SD may be obtained from the image information 20 that is imaged by the boat 100. However, the disclosure is not limited thereto. In another embodiment of the disclosure, the second data SD may be obtained from image information 20 that is imaged by an other boat, for example, the first other boat OB1 and/or the second other boat OB2. In another embodiment of the disclosure, the second data SD may be obtained from a database that accumulates a plurality of data from a plurality of other boats OB and/or the boat 100. The above are described as examples only and are not intended to limit the disclosure.

Figure 9:
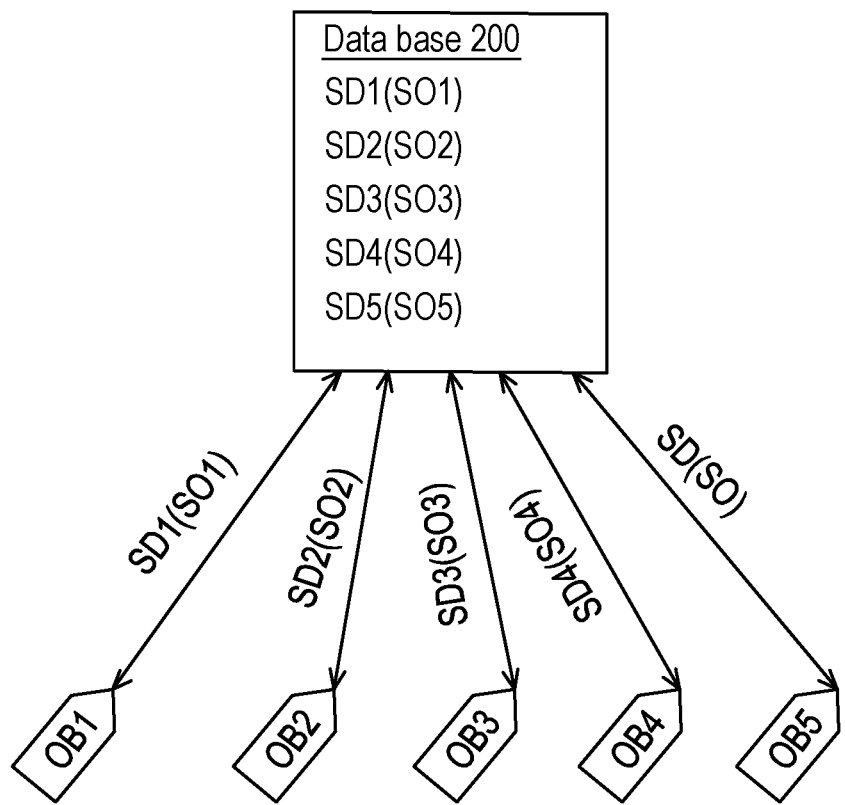
FIG. 9 is a schematic diagram illustrating a method of obtaining a second data from a database according to an embodiment of the disclosure.

FIG. 9 is a schematic diagram illustrating a method of obtaining a second data from a database according to an embodiment of the disclosure. Referring to FIG. 9, a plurality of other boats OB1, OB2, OB3, OB4 may be connected wirelessly to a database 200. The other boat OB5 may be, for example, the boat 100. The boat 100 may also be connected to the database 200. A number of the plurality of other boats is not intended to limit the disclosure. The database 200 may be, for example, a cloud server. The database 200 may include a processor and a memory. Each of the plurality of other boats OB1, OB2, OB3, OB4 may obtain a second data SD and/or a second outline SO. Each of the second data SD and/or the second outline SO obtained by each of the plurality of other boats OB1, OB2, OB3, OB4 may be an outline of a different port P or a same port P, and is not intended to limit the disclosure. The second data SD and/or the second outline SO obtained by the other boats OB1, OB2, OB3, OB4 and the boat 100 may be uploaded to the database 200. In more detail, the first data FD and/or the second data SD obtained by any of the boat 100 and/or the other boats OB1, OB2, OB3, OB4 may be uploaded to the database 200 as second data SD. That is to say, the first data FD obtained by any of the other boats OB1, OB2, OB3, OB4 and/or the boat 100 may be stored in the database 200 as second data SD. In this way, other users of the system may utilize (download) the second data SD (which may include first data FD and/or second data SD) stored in the database 200 as the second data SD. The database 200 stores the plurality of second data SD and/or the plurality of second outlines SO in the memory of the database 200 (SD1(SO1), SD2(502), SD3(503), SD4(504)). The plurality of second outlines SO, SO1, SO2, SO3, SO4 are determined from the plurality of second data SD, SD1, SD2, SD3, SD4 respectively. Any of the boat 100 and/or the other boats OB1, OB2, OB3, OB4 may connect to the database 200 to retrieve/access the second data SD and/or second outline SO (SD1(SO1), SD2(502), SD3(503), SD4(504)) stored in the database 200. In this way, the control unit 10 may obtain the second data SD from the database 200 that accumulates a plurality of second data (SD1(SO1), SD2(502), SD3(503), SD4(504)) from a plurality of other boats OB1, OB2, OB3, OB4. In short, the control unit 10 of the boat 100 (or the other boats OB1, OB2, OB3, OB4) may upload and store at least one of the first data FD or the second data SD in the database 200 as second data SD, and other users of the system may utilize the second data SD stored in the database 200 for determining the open berth of the port P.

Referring to FIG. 9, the database 200 stores the plurality of the second data SD1, SD2, SD3, SD4 and/or the plurality of the second outlines SO1, SO2, SO3, SO4. The plurality of the second outlines SO1, SO2, SO3, SO4 may be an outline of a different port P or a same port P that the boat 100 is presently located in at the first time T1, and is not intended to limit the disclosure. A method is needed to determine which one of the plurality of second outlines SO1, SO2, SO3, SO4 is the outline of the port P. A method is needed to determine which one of the plurality of second outlines SO1, SO2, SO3, SO4 is the outline of the port P which is the same port P that the boat 100 is presently located in at the first time T1. Accordingly, the control unit 10 may compare the first outline FO to the plurality of second outlines SO1, SO2, SO3, SO4 stored in the memory, and when a similarity between a shape of the first outline FO and a shape of one of the plurality of second outlines SO1, SO2, SO3, SO4 is greater than a predetermined threshold, then the control unit 10 may determine the one of the plurality of second outlines SO1, SO2, SO3, SO4 is an outline of the port P, and not an outline of a different port. The control unit 10 then assigns the one of the plurality of second outlines SO1, SO2, SO3, SO4 as the second outline SO, and the one of the plurality of the second data SD1, SD2, SD3, SD4 corresponding to the one of the plurality of second outlines SO1, SO2, SO3, SO4 as the second data SD. It should be noted the second data SD obtained from the boat 100 (the other boat OB5 of FIG. 9) may also be uploaded to the database 200, for example, as the second data SD5 and the second outline SO5.

Referring to FIG. 9, there may be a case where more than one of the second outlines SO1, SO2, SO3, SO4 stored in the database 200 are determined to be the outline of the same port P that the boat 100 is presently located in at the first time T1. When more than one of the second outlines SO1, SO2, SO3, SO4 stored in the database 200 are determined to be the outline of the same port P that the boat 100 is presently located in at the first time T1, the one of the second outlines SO1, SO2, SO3, SO4 having the least similarity to the first outline FO may be assigned as the second outline SO. In this way, there may be a higher chance of identifying an open berth or identifying a berth that is presently occupied by an other boat. However, the disclosure is not limited thereto, and the second outline SO may be assigned according to user requirements.

In the above embodiments, it was described that the control unit 10 determines the open berth or the berth that is presently occupied by an other boat without using a GNSS receiver. Namely, the open berth and/or the berth that is presently occupied was determined based on the difference in shape DS between the first outline FO and the second outline SO obtained from the first data FD and the second data SD. However, the disclosure is not limited thereto. In another embodiment of the disclosure, the control unit 10 may determine the open berth and/or the berth that is presently occupied by using a GNSS receiver.

For example, in another embodiment of the disclosure, the control unit 10 may determine the open berth and/or the berth that is presently occupied, by using a GNSS receiver. For example, the first data FD and the second data SD may be assigned position data respectively. That is so say, the first data FD may be assigned position data, and the second data SD may be assigned position data. The position data may be, for example, longitude and latitude coordinates. The longitude and latitude coordinates may be obtained by, for example, a GPS. For example, if position data assigned to second data SD is different from position data assigned to the first data FD, the control unit 10 may determine the second outline SO obtained from the second data SD is not the outline of the port P, even when the similarity between the shape of the first outline and the shape of the second outlines is greater than the predetermined threshold.

Referring to FIG. 9, in the case there are the plurality of the second data SD1, SD2, SD3, SD4, SD5, if position data assigned to the one of the plurality of second data SD1, SD2, SD3, SD4, SD5 is different from position data assigned to the first data FD, the control unit 10 may determine the one of the plurality of second data SD1, SD2, SD3, SD4, SD5 is not the outline of the port P, even when the similarity between the shape of the first outline FO and the shape of one of the plurality of second outlines SO1, SO2, SO3, SO4, SO5 is greater than the predetermined threshold. In this way, position data is stored in association with the second data SD, and the control unit 10 determines the second data SD1, SD2, SD3, SD4, SD5 to be obtained based on a present position (GPS location) of the boat 100 at the first timing T1.

Figure 10:
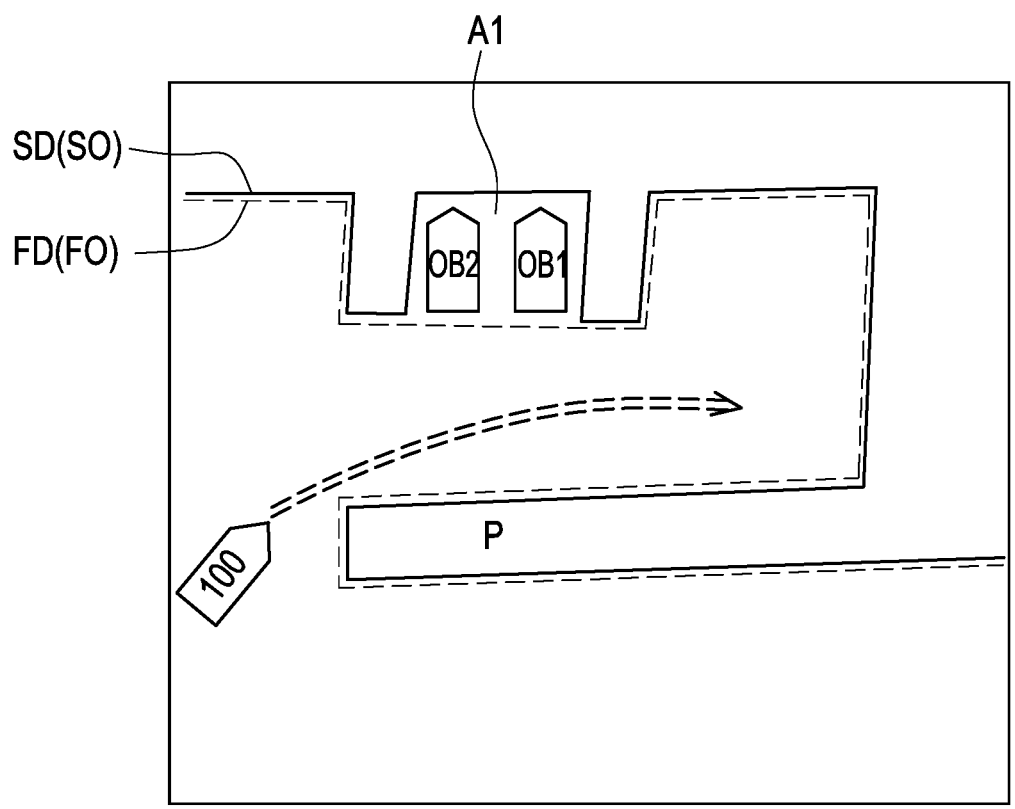
FIG. 10 is a schematic diagrams illustrating a first data superimposed on the map of the port according to an embodiment of the disclosure.

FIG. 10 is a schematic diagrams illustrating a first data superimposed on the map of the port according to an embodiment of the disclosure. Referring to FIG. 10, the control unit 10 may receive a map of the port P from, for example, the database 200. In the present embodiment, the map of the port P may be the second data SD. That is to say, the second outline SO may be determined from the map of the port P obtained from the database 200. The first outline FO of the first data FD is superimposed on the second outline SO of the map of the port P.

Figure 11:
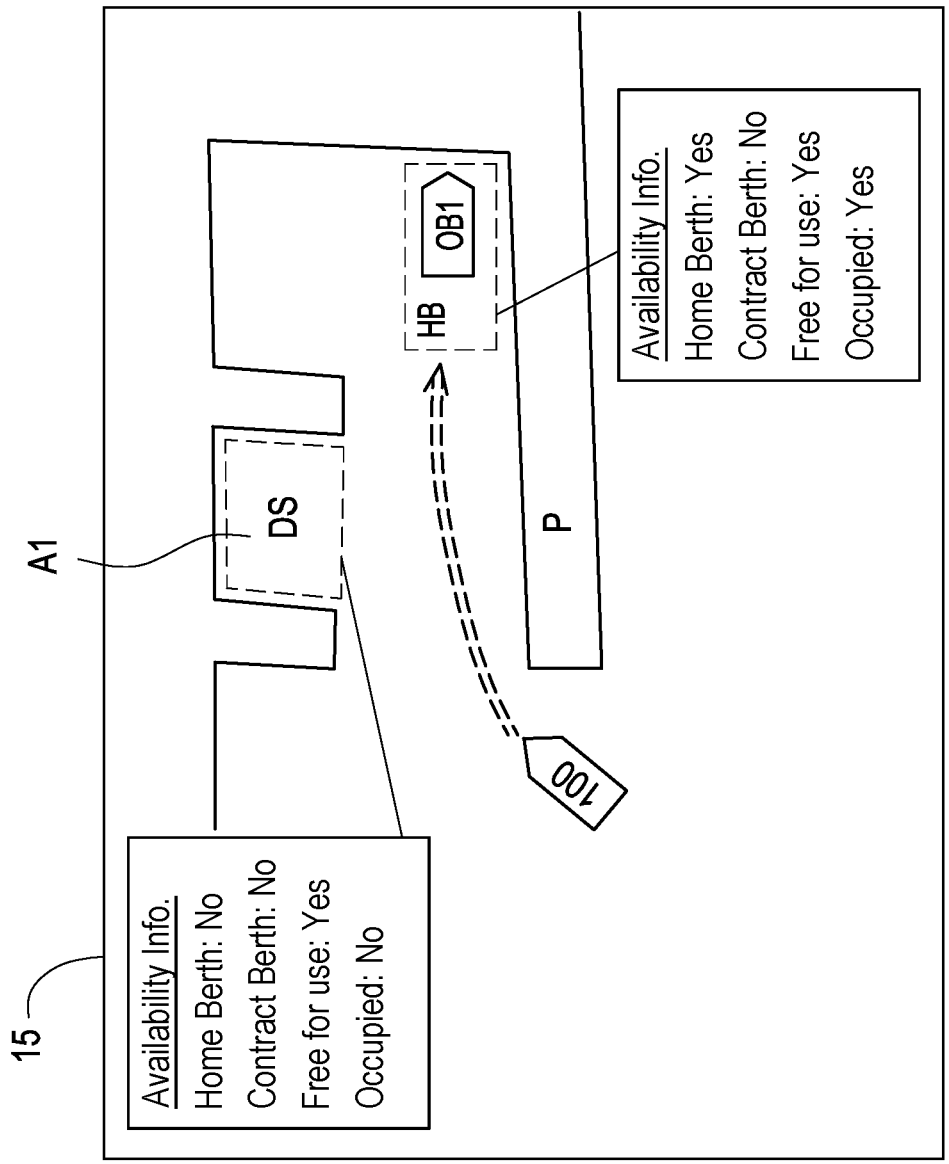
FIG. 11 is a schematic diagrams illustrating a display on a monitor according to an embodiment of the disclosure.

FIG. 11 is a schematic diagrams illustrating a display on a monitor according to an embodiment of the disclosure. Referring to FIG. 11, the control unit 10 may store position data of a home berth HB of the boat 100. An outline delineating an area of the home berth HB may be displayed on the monitor 15. The position data of the home berth HB may be predetermined and may be stored in the memory of the control unit 10 by, for example, a user. The position data may be, for example, the longitude and latitude coordinates (or a range of longitude and latitude coordinates) corresponding to the area of the home berth HB. In addition, the map of the port P may be displayed on the monitor 15.

Referring to FIG. 11, the control unit 10 may detect that an other boat OB1 is berthed at the home berth HB of the boat 100, via the image information 20 obtained at the first timing T1. When the control unit 10 detects that the other boat OB1 is berthed at the home berth HB of the boat 100 via the image information 20 (or the first data FD), the control unit 10 may suggest an open berth to a user on display (the monitor 15). In more detail, the area of the difference in shape DS obtained in FIG. 5 may be displayed on the monitor 15. That is to say, for example, an outline delineating an area of the difference in shape DS may be displayed on the monitor 15 as a suggestion of an open berth.

Referring to FIG. 11, the control unit 10 may assign availability information to the open berth. The availability information may include, for example, at least one of a home berth information, a contract berth information, a free for use berth information. The home berth information specifies whether the berth is the home berth HB of the boat 100. The contract berth information specifies whether the berth is a contract berth. The free for use berth information specifies whether the berth is free for any user to use. In this way, the availability information may be displayed on the display (the monitor 15).

In addition to the availability information, port information may be displayed on the display (the monitor 15). The port information may include, for example, accident information or the construction information in the port P. The accident information and/or the construction information in the port P may be displayed on the display (the monitor 15) to notify a user. The port information may be stored in, for example, the database 200, and may be uploaded to the database 200 by, for example, a port authority.

After the control unit 10 determines the location of the open berth, the control unit 10 calculates and/or sets an automatic mooring route MR of the boat 100 based on the position data of the open berth. The automatic mooring route MR of the boat 100 may be displayed on the monitor 15.

The control unit 10 may be configured to receive an input from a user via an input unit. The input unit may include, for example, a computer mouse and/or a keyboard. In another embodiment, the monitor 15 may include, for example, a capacitive touch screen to act as a touch screen to receive input from the user. A number of open berths identified by the control unit 10 is not intended to limit the disclosure. In another embodiment of the disclosure, the open berth may include a plurality of open berths, for example, a first open berth and a second open berth. The open berth among the plurality of open berths for mooring the boat 100 may be selected/changed by a user via the input unit.

In an embodiment of the disclosure, a time stamp may be assigned to the second data SD, and the control unit 10 may identify, based on a time series, whether a shape difference between the first data FD and the second data SD is the open berth or a change in area of a port wall. More specifically, the control unit 10 may identify, based on a time series, whether the difference in shape DS between the first outline FO and the second outline SO is the open berth or a change in area of a port wall. When the control unit 10 determines the difference in shape DS is due to the change in area of the port wall, the control unit 10 determines the difference in shape DS is not the open berth for mooring the boat 100. The change in area of the port wall may occur due to, for example, construction or corrosion of the port P (port wall).

Since there may be some variation in accuracy between the outlines of the first outline FO and the second outline SO, a predetermined area threshold may be set by a user. For example, when the area of the difference in shape DS is greater than the predetermined area threshold, the control unit 10 may determine the area of the difference in shape DS is the open berth. In another example, when the area of the difference in shape DS is less than the predetermined area threshold, the control unit 10 may determine the area of the difference in shape DS is not the open berth, but due to variation in accuracy between the outlines of the first outline FO and the second outline SO, or due to construction or corrosion. The predetermined area threshold may be, for example, 4 square meters, 5 square meters, 10 square meters and/or the like. However, the disclosure is not limited thereto, and the predetermined area threshold may be set according to requirements.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A system, adapted for a boat to accumulate and utilize information of a port, the system comprising:
 a control unit, comprising a processor, configured to function as:
 a determining part that determines an open berth of the port; and
 a display part that displays the open berth determined by the determining part on a display;
 wherein the control unit determines the open berth based on a first data and a second data,
 the first data includes information of the port obtained at a first timing by a sensor disposed on the boat,
 the second data includes information of the port obtained at a second timing,
 the first timing is different from the second timing,
 a first outline of a plurality of obstacles of the port at the first timing is determined from the first data;
 a second outline of a plurality of obstacles of the port at the second timing is determined from the second data;
 the control unit superimposes the first outline with the second outline, and determines a difference in shape between the first outline and the second outline, and an area of the difference in shape is determined to be the open berth.

2. The system according to claim 1, wherein when an obstacle is identified at a first position in the second data but the obstacle is not identified at the first position in the first data, the control unit determines the first position as the open berth.

3. The system according to claim 1, wherein when an obstacle is identified at a first position in the first data but the obstacle is not identified at the first position in the second data, then the control unit determines the first position is a berth that is presently occupied by an other boat.

4. The system according to claim 1, wherein the second data is data that is obtained by the boat at the second timing when the boat departed from the port.

5. The system according to claim 4, wherein the first timing is a timing when the boat returned to the port, and the first timing is a present time.

6. The system according to claim 1, wherein the second data is data that is obtained by an other boat.

7. The system according to claim 1, wherein the control unit obtains the second data from a database that accumulates a plurality of second data from a plurality of other boats.

8. The system according to claim 1, wherein the control unit receives a map of the port from a database, the map of the port is assigned as the second data,
and the first outline is superimposed on the second outline obtained from the map of the port.

9. The system according to claim 1, wherein a position information is stored in association with the second data, and the control unit determines the second data to be obtained based on a present position of the boat.

10. The system according to claim 1, wherein the control unit determines the open berth without using a GNSS receiver.

11. The system according to claim 1, wherein a time stamp is assigned to the second data, and the control unit identifies based on a time series, whether the difference in shape between the first outline of the first data and the second outline of the second data is the open berth or is a change in an area of a port wall.

12. The system according to claim 1, further comprising:
a memory storing a plurality of second data, a plurality of second outlines are determined from the plurality of second data;
the control unit compares the first outline to the plurality of second outlines stored in the memory, and when a similarity between a shape of the first outline and a shape of one of the plurality of second outlines is greater than a predetermined threshold, then the control unit determines the one of the plurality of second outlines is an outline of the port, and assigns the one of the plurality of second outlines as the second outline.

13. The system according to claim 1, wherein the control unit uploads and stores at least one of the first data or the second data in a database as second data, and other users of the system may utilize the second data stored in the database.

14. The system according to claim 1, wherein when the control unit detects that an other boat is berthed at a home berth of the boat, the control unit suggests the open berth to a user on the display.

15. The system according to claim 1, wherein the control unit assigns availability information to the open berth, the availability information including at least one of a home berth information, a contract berth information, a free for use berth information,
the availability information is displayed on the display.

16. The system according to claim 1, wherein the control unit compares the first data and the second data and detects an other boat that is berthed.

17. The system according to claim 1, wherein the control unit compares the first data and the second data and identifies a possible berthing location, the possible berthing location is identified as the open berth.

18. The system according to claim 1, wherein port information is stored in a database, the port information including at least one of accident information or construction information,
and the at least one of the accident information or the construction information is displayed on the display.

19. The system according to claim 1, wherein
the first outline is an outline of an outer most surface of the plurality of obstacle of the port that is closest to the boat at the first timing,
the second outline is an outline of an outer most surface of the plurality of obstacle of the port that is closest to the boat at the second timing.

20. A system, adapted for a boat to accumulate and utilize information of a port, the system comprising:
a control unit, comprising a processor, configured to function as:
a determining part that determines an open berth of the port; and
a display part that displays the open berth determined by the determining part on a display;
wherein the control unit determines the open berth based on a first data and a second data,
the first data includes information of the port obtained at a first timing by a sensor disposed on the boat,
the second data includes information of the port obtained at a second timing,
the first timing is different from the second timing,
the system further comprising:
a memory storing a plurality of second data, a plurality of second outlines are determined from the plurality of second data;
wherein a first outline of a plurality of obstacles of the port at the first timing is determined from the first data,
wherein the control unit compares the first outline to the plurality of second outlines stored in the memory, and when a similarity between a shape of the first outline and a shape of one of the plurality of second outlines is greater than a predetermined threshold, then the control unit determines the one of the plurality of second outlines is an outline of the port, and assigns the one of the plurality of second outlines as the second outline,
wherein the control unit determines a difference in shape between the first outline and the second outline, and an area of the difference in shape is determined to be the open berth,
wherein if position data assigned to the one of the plurality of second data is different from position data assigned to the first data, the control unit determines the one of the plurality of second data is not the outline of the port, even when the similarity between the shape of the first outline and the shape of one of the plurality of second outlines is greater than the predetermined threshold.

* * * * *